United States Patent [19]

Mok

[11] Patent Number: 5,449,963
[45] Date of Patent: Sep. 12, 1995

[54] ARMATURE END PROTECTOR FOR A WOUND ROTOR

[75] Inventor: Kam-Shing Mok, Yuen Long, Hong Kong

[73] Assignee: Johnson Electric S.A., Switzerland

[21] Appl. No.: 259,997

[22] Filed: Jun. 15, 1994

[30] Foreign Application Priority Data

Jun. 15, 1993 [GB] United Kingdom ............... 9312312

[51] Int. Cl.[6] ............................................. H02K 3/46
[52] U.S. Cl. ...................... 310/270; 310/42; 310/43; 310/91; 310/216
[58] Field of Search ............... 310/270, 269, 216, 217, 310/218, 45, 91, 260, 261, 42, 43; 336/197

[56] References Cited

U.S. PATENT DOCUMENTS

| | | | |
|---|---|---|---|
| 3,244,919 | 4/1966 | Drenth et al. | 310/261 |
| 3,831,268 | 8/1978 | Boyd | 310/216 |
| 4,063,123 | 12/1977 | Herr et al. | 310/270 |
| 4,833,353 | 5/1989 | Hansen | 310/216 |
| 4,967,111 | 10/1990 | Andrieux et al. | 310/42 |
| 5,304,885 | 4/1994 | Wong et al. | 310/216 |
| 5,327,037 | 7/1994 | Rasmussen | 310/42 |
| 5,329,199 | 7/1994 | Yockey et al. | 310/42 |

FOREIGN PATENT DOCUMENTS

| | | |
|---|---|---|
| 505477 | 10/1938 | United Kingdom . |
| 1549778 | 8/1975 | United Kingdom . |
| 1543352 | 8/1976 | United Kingdom . |

OTHER PUBLICATIONS

*Patent Abstracts of Japan*, vol. 14, No. 62 (E–883)(4005), Feb. 5, 1990, JP-A-01 283037, Nov. 14, 1989.

*Primary Examiner*—R. Skudy
*Attorney, Agent, or Firm*—Ostrolenk, Faber, Gerb & Soffen

[57] ABSTRACT

An armature end protector for protecting rotor windings from the end of a rotor stack, includes a hub and a body portion. The body portion has a plurality of radially extending spokes which cover arms of laminated members of the rotor, at least in the region of the rotor windings. The body portion is fitted to and supported by the hub. A circumferentially extending ridge is formed on the hub to provide a stop against which the body portion abuts to correctly locate the body portion on the hub. The ridge also increases the electrical separation distance between the rotor windings and the rotor stack.

9 Claims, 3 Drawing Sheets

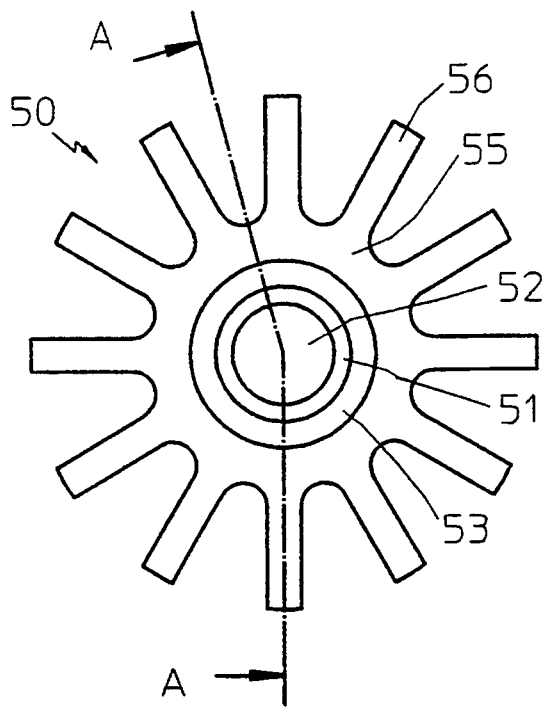
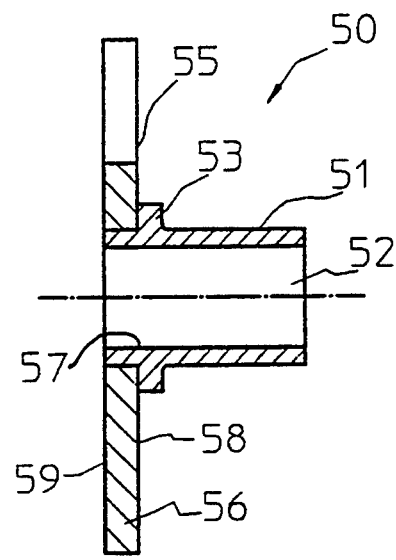
FIG. 3          FIG. 4
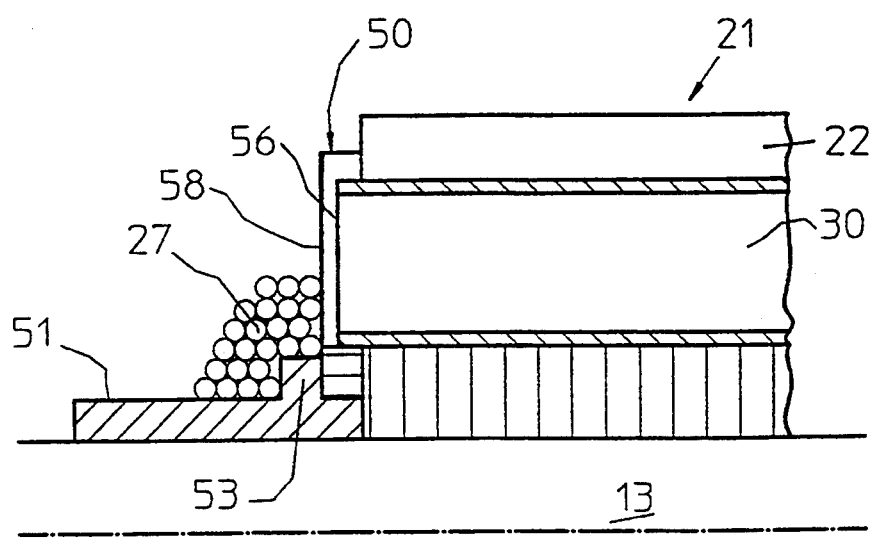
FIG. 5

ARMATURE END PROTECTOR FOR A WOUND ROTOR

FIELD OF THE INVENTION

The present invention relates to a wound rotor for an electric motor. More particularly, the invention relates to a spider or armature end protector for a wound rotor having a laminated stack and to wound rotors and electric motors incorporating such spiders.

BACKGROUND ART

Wound rotors having laminated stacks are well known. The stacks are formed from a number of laminated steel members each having a plurality of "T"-shaped arms extending radially from a central hub. The hub has a central hole for mounting the laminated steel member on a shaft. The distal end of the arms have circumferentially extending projections to form the familiar "T"-shape with the projections facing adjacent projections across a small gap. The area defined by adjacent arms is known as a winding tunnel and when the rotor is being wound, the wire of the windings (also known as magnet wire) is passed through the small gaps so as to be located in the winding tunnels.

For many, motors, such as A.C. motors operating at line or mains voltage, the winding tunnels are lined with insulation, called slot insulation, to isolate the windings from the rotor stack. At the end of the stack, it is known to provide an armature end protector, also known as a spider because of its appearance, to maintain the separation between the magnet wire and the rotor stack. It is common for the slot insulation to be a sheet of insulation material such as MYLAR paper which is located in and line the walls of the tunnels. These sheets do not wrap around the ends of the winding tunnels and thus, the spiders are needed to guarantee the creepage distance or separation between the rotor stack and the windings.

It is known to make these spiders from fiber material, thermosetting plastic material and from thermosoftening plastic material. It is usual to provide spacers between the spiders and the commutator and fan. The spacers not only regulate the distance between the rotor stack and the commutator and fan but also provide an insulated sleeve over the shaft where the wire would otherwise lay on the shaft. The spacers tires need to be made of insulating material which can withstand the heat generated by the windings and be sufficiently thick to maintain the required separation.

Gaps between the spacers and spiders may occur during faulty assembly or during use which may lead to insulation failure. A spider and spacer combination overcome this problem and thus are preferred. However, spacers made from fiber material are too expensive for normal applications.

Single piece combined spiders and spacers made from plastic materials work satisfactorily but they do have disadvantages. Thermosoftening plastic generally cannot withstand the heat which can be developed in modern motors under abnormal conditions such as when operating under stall conditions, leading to melting and distortion of the spider portion and/or spacer portion which may result in a breach of the separation requirement leading to insulation failure.

Spiders of thermosetting plastic material, on the other hand, can tolerate the high temperature of the windings but tend to be brittle. For smaller motors, the diameter of the rotor and the spider is small. The spokes of the spider are thin and, due to their brittle nature, break easily. Hence, for small multislot motors, the use of thermosetting plastic material spiders is not viable due to the care required during assembly and handling to avoid breaking the spokes of the spider.

Epoxy coating of the rotor stack is also known as an alternative to using slot insulation and spiders. However, as it is difficult to ensure that the stack is evenly coated with a sufficient depth of epoxy, especially on the edges and without pinholes, its application is generally restricted to low voltage applications.

DISCLOSURE OF THE INVENTION

The present invention seeks to mitigate the disadvantages of the prior art armature end protectors or spiders while still being economical to manufacture.

This is achieved by providing a two-part armature end protector which combines the spider-portion and spacer-portion.

Accordingly, in one aspect, the present invention provides a spider for an electric motor comprising a hub and a radially extending body portion with radially extending spokes, wherein the body portion is fitted to and supported by the hub.

Preferably, the hub and body portion are made from different materials. For example, the body portion is made from a deformable electrically insulating material such as fiber sheet material and the hub is made from a plastic material such as phenolic or similar heat resistant plastic material.

Preferably, a ridge or step is formed on the radially outer surface of the hub and abuts the body portion.

According to a second aspect, the present invention provides a wound rotor for an electric motor comprising: a shaft; a laminated stack supported on the shaft and formed with radially extending arms around which rotor windings are wound, the stack having a plurality of laminated steel members stacked one against another; and two spiders positioned against respective ends of the stack inside the armature windings, each spider having a hub of temperature resistant plastic material fitted to and supporting a body portion with integral spokes formed from electrically insulating material, the spokes abutting and covering the arms of the stack at least in the region of the rotor windings.

One preferred embodiment of the spider, according to the present invention, will now be described, by way of example only, with reference to the accompanying drawings.

BRIEF DESCRIPTION OF THE DRAWINGS

FIG. 3 is a front elevational view of the spider of FIG. 2;

FIG. 4 is a sectional side view of the spider taken along section line A—A of FIG. 3;

FIG. 5 is a part view of a longitudinal section of the rotor of FIG. 1 showing how the rotor windings lay on the spider;

DETAILED DESCRIPTION OF THE PREFERRED EMBODIMENTS

Figure 1:
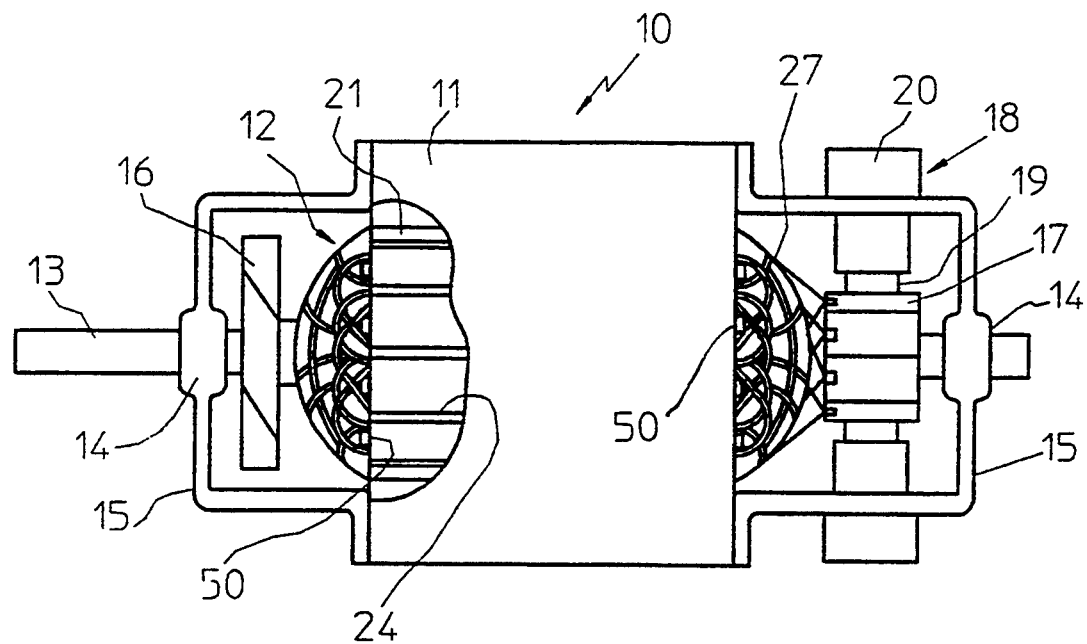
FIG. 1 is a part sectional view of a universal motor having a wound rotor incorporating a spider according to a preferred embodiment of the present invention, the connecting wires and stator windings have been omitted for clarity.

A universal motor incorporating a spider according to the present invention is shown in FIG. 1. The motor 10 has a stator 11. A wound rotor 12 is located within the stator 11 which is shown with a cutaway portion to more clearly show the rotor 12. The rotor 12 is fitted to a shaft 13 which is journalled in bearings 14 at either end of the motor. The bearings are supported by bearing supports 15 in the form of "U"-shaped brackets which extend from either end of the stator 11. At one end of the motor 10 (the drive end) a fan 16 is located on the shaft 13 between the bearing 14 and the rotor 12.

A commutator 17, forming part of the rotor 12, is mounted at the end of the motor 10 that is opposite to the fan 16. The commutator 17 connects the rotor windings 27 to a source of electrical power via a brush assembly 18 in the usual manner. The brush assembly comprises brushes 19 which are arranged in sliding contact with the commutator 17 and are held by and supported within brush holders 20. The wires connecting the brushes to the stator windings and/or external power supply have been omitted from the drawings for clarity.

Figure 6:
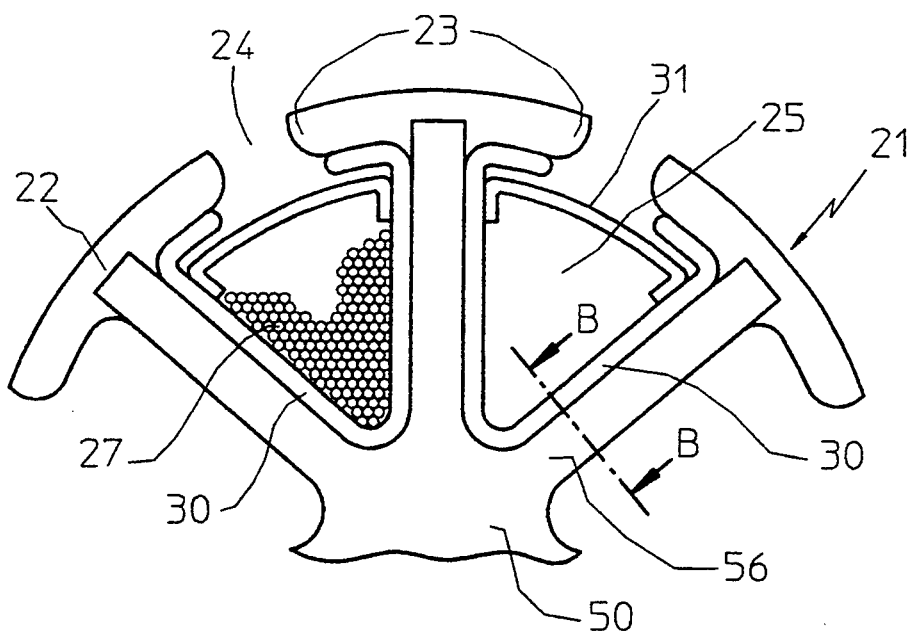
FIG. 6 is a partial end view of the rotor of FIG. 1 illustrating how the spokes of the spider cover the arms of the rotor and showing slot insulation, with the rotor windings sectioned/omitted for clarity.

The rotor 12 comprises a plurality of laminated steel laminations members 21 which are stacked together to form the rotor stack. The laminated members 21 have a central annular portion through which the motor shaft 13 passes and radially extending arms 22. Each as shown in FIG. 6, each 22 arm at its distal end has circumferentially extending projections 23 to form the familiar "T"-shape. The projections 23 face projections 23 of adjacent arms 22 with a small gap 24 therebetween. The "T"-shaped arms 22 thus form winding tunnels 25 through which the rotor windings 27 pass as they are wound around the arms of the laminations to form the rotor.

The wire from which the rotor windings 27 are formed is insulated usually with varnish or a polymer coating to avoid shorting between turns of the windings. As shown in FIG. 6, slot insulation 30, as is well known, lines the winding tunnel 25 to insulate the windings 27 from the rotor stack. Slot insulation 30 is commonly strips of MYLAR paper with a second strip 31 to cover the radially outer side of the windings 27 and to close the gap 24 between the arms 22 after the rotor has been wound. As is known, a spider 50 is provided at respective ends of the rotor and cooperates with the slot insulation 30 to maintain a minimum separation or creepage between the wires and the rotor stack and shaft.

Figure 2:
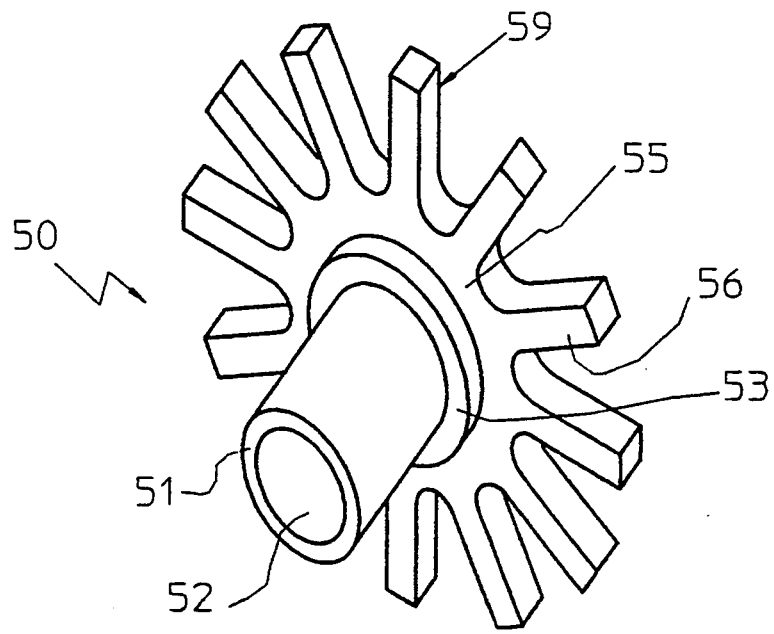
FIG. 2 is a perspective view of the preferred spider.

The spider 50, according to the present invention and as more clearly illustrated in FIGS. 2, 3 and 4, comprises two parts fitted together. The first part is a hub 51 which also acts as a spacer between the rotor stack and the commutator 17 and/or fan (where fitted). The hub 51 has a central hole 52 through which the motor shaft 13 passes. The outer surface of the hub 51 has a ridge or annular projection 53.

The second part comprises a body portion 55 which is mounted to and supported by the hub 51 and is preferably connected by a press fit thereon. The ridge 53 acts as a stop to ensure that the body portion 55 is correctly fitted to the hub 51. The body portion has radially extending spokes 56, a front face 58 which abuts the ridge 53 and a rear face 59 which abuts an end laminated member 21 of the rotor. The spokes 56 correspond in number to the arms 22 of the laminated member 21 and are of a similar shape at least in the region where the windings 27 contact the spider. The spokes 54 are designed to maintain a minimum separation distance between the windings 27 and the rotor stack in cooperation with the slot insulation.

The body portion 55 is made from a material which is soft enough to withstand normal assembly handling without being damaged or deformed and is also sufficient 14 heat resistant to avoid melting or charring when the rotor windings become hot, for example, under stall conditions. Preferably, the material is a non-brittle or deformable material and in the preferred embodiment the body portion is stamped from vulcanized fiber sheet material.

The hub 51 is also preferably made from a heat resistant insulating material which is moldable so that the hub can be produced by injection molding. For example, the preferred material is a plastic material such as phenolic.

As shown in FIG. 4, body portion 55 has a central hole 57 which is press fitted over the hub 51 to form the completed spider. The spider then becomes a single item formed from two parts. The two part construction allows the two parts to be made from materials, more ideally suited to their function.

The ridge 53 on the hub 51, as more clearly illustrated in FIGS. 4 and 5, raises the height of the first turn of the winding 27 from the shaft 13 and also increases the electrical creepage distance over a plain spider with an abutting spacer. As can be seen in FIG. 5, the rotor windings 27 lay on the surface of the hub 51 and thus, it is preferred that the hub is made from a heat resistant material to withstand the increase in temperature of the wire developed during stall conditions etc.

FIG. 5 is a partial longitudinal sectional view of the rotor 12. The windings in the front winding tunnel have been omitted for clarity. The spider 50 abuts the end of the rotor stack. Slot insulation 30 extends along the winding tunnel 25 substantially to the front face 59 of the spokes 56. The second strip 31 of the slot insulation, which internally covers and closes the longitudinal gap 24 along the winding tunnel 25, also has been omitted for clarity.

FIG. 6 is a partial end view of the rotor 12 with the windings sectioned or omitted for clarity. The "T"-shaped arms 22 of the stack are clearly shown as is the formation of the winding tunnels 25 and the gap 24 between the adjacent ends of the arms 22. FIG. 6 illustrates the use and location of the slot insulation 30, including the second strip 31 as well as how the slot insulation interacts with the spider 50 and how the spokes 56 cover the arms 22 of the stack in the region where the windings 27 cross the arms 22.

Figure 7:
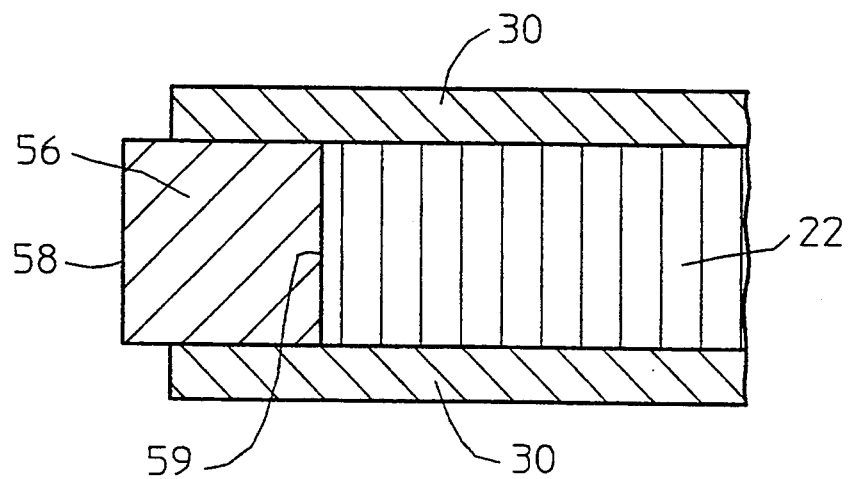
FIG. 7 is a part view of a section through the rotor along section line B—B of FIG. 6, showing the cut surfaces only and illustrating the relationship between the slot insulation and the spider.

FIG. 7 is a partial view of a longitudinal section across one arm 22 of the rotor stack. Rear face 59 of the spider 50 abuts the end laminated members 21 of the stack. Slot insulation 30 lies along each long side of the arm 22 forming the walls of the winding tunnels. The ends of the slot insulation 30 extend to substantially the front face 58 of the spider spokes 56 of the spider 50.

I claim:

1. A spider for a wound rotor of an electric motor, the spider comprising:
   a hub; and
   a radially extending body portion with radially extending spokes, fitted to and supported by the hub; wherein
   the body portion and the hub are made from different materials.

2. A spider as defined in claim 1, wherein the body portion is mounted on the hub by a press fit.

3. A spider as defined in claim 1, wherein the body portion is formed from a vulcanized fiber sheet material.

4. A spider as defined in claim 1, wherein the hub is made from a thermosetting plastic material.

5. A spider as defined in claim 1 wherein a ridge is formed on a radially outer surface of the hub and abuts the body portion.

6. A spider as defined in claim 5, wherein the ridge is formed at a distance from an end of the hub, which distance is equal to a thickness of the body portion.

7. A spider for a wound rotor of an electric motor, the spider comprising:
   a hub formed of thermosetting plastic and having a circumferentially extending continuous ridge on a radially outer surface located at a distance from one axial end of the hub to form a shouldered seat of a predetermined width; and
   a radially extending body portion, having radially extending spokes and a thickness substantially equal to the predetermined width of the seat, the body portion being formed from a vulcanized fiber sheet material, the body portion being supported by the hub and fitted to the seat.

8. A wound rotor for an electric motor, comprising:
   a plurality of rotor windings;
   a shaft;
   a laminated stack supported on the shaft and formed with radially extending arms around which the rotor windings are wrapped, the stack comprising a plurality of laminated steel members stacked one against another; and
   two spiders positioned against respective ends of the stack inside the rotor windings, each spider having a body portion and a hub, the hub being formed of temperature resistant plastic material fitted to and supporting the body portion, the body portion having integral spokes and being formed from a deformable electrically insulating material, the spokes fitting against and covering the arms of the stack at least at a location of the windings.

9. A wound rotor for an electric motor as defined in claim 8, wherein each spider has a ridge formed on a radial outer surface of the hub and located at a distance from one end of the hub that is substantially equal to a thickness of the body portion and the ridge being located for abutting the body portion.

* * * * *